United States Patent
Gabbey (10) Patent No.: US 12,265,100 B2
(45) Date of Patent: Apr. 1, 2025

(54) ELECTRICAL TESTING DEVICE WITH PROBE HAVING PORTIONS WITH DIFFERENT CROSS-SECTIONAL AREAS

(71) Applicant: Snap-on Incorporated, Kenosha, WI (US)

(72) Inventor: Nicholas A. Gabbey, Mount Pleasant, WI (US)

(73) Assignee: Snap-On Incorporated, Kenosha, WI (US)

( * ) Notice: Subject to any disclaimer, the term of this patent is extended or adjusted under 35 U.S.C. 154(b) by 218 days.

(21) Appl. No.: 18/113,608

(22) Filed: Feb. 23, 2023

(65) Prior Publication Data

US 2024/0288471 A1    Aug. 29, 2024

(51) Int. Cl.
*G01R 1/067*    (2006.01)
*G01R 13/02*    (2006.01)
(Continued)

(52) U.S. Cl.
CPC ..... *G01R 1/06738* (2013.01); *G01R 1/06788* (2013.01); *G01R 13/0209* (2013.01); *G01R 15/125* (2013.01); *G01R 19/2503* (2013.01)

(58) Field of Classification Search
CPC .............. G01R 1/00; G01R 1/02; G01R 1/06; G01R 1/067; G01R 1/06711; G01R 1/06733;
(Continued)

(56) References Cited

U.S. PATENT DOCUMENTS 2,623,925 A    12/1952    Schaefer
4,949,274 A    8/1990    Hollander et al.
(Continued)

FOREIGN PATENT DOCUMENTS

CN    203337694 U    12/2013
EP    3130928 A1    2/2017
(Continued)

OTHER PUBLICATIONS

Everett Charles, "Step Probes", retrieved at https://ect-cpg.com/step-probes on Oct. 20, 2022.
(Continued)

*Primary Examiner* — Hoai-An D. Nguyen
(74) *Attorney, Agent, or Firm* — McDonnell Boehnen Hulbert & Berghoff LLP (57) ABSTRACT

A device for testing a voltage level in an electrical terminal cavity including a testing body and a probe for contacting the electrical terminal cavity. The probe includes a tip portion having a first cross-sectional area, a base portion having a second cross-sectional area, and an intermediate portion extending from the tip portion to the base portion having a third cross-sectional area. The first cross-sectional area is smaller than the third cross-sectional area, the third cross-sectional area is smaller than the second cross-sectional area, and the intermediate portion is concentric with the tip portion and the base portion. An axis extends between a center of the tip portion, a center of the intermediate portion, a center of the base portion, and a center of the testing body. The device also includes a circuit operatively coupled with the probe to sense the voltage level in the electrical terminal cavity.

20 Claims, 6 Drawing Sheets

(51) Int. Cl.
G01R 15/12 (2006.01)
G01R 19/25 (2006.01)

(58) Field of Classification Search
CPC ............ G01R 1/06738; G01R 1/06788; G01R 13/00; G01R 13/02; G01R 13/0209; G01R 15/00; G01R 15/12; G01R 15/125; G01R 19/00; G01R 19/25; G01R 19/2503
USPC .............................................. 324/76.11, 149
See application file for complete search history.

(56) References Cited

U.S. PATENT DOCUMENTS

| | | | |
|---|---|---|---|
| 5,291,124 A * | 3/1994 | Hoffman | G01R 1/06777 324/156 |
| 5,512,839 A | 4/1996 | De Monaco | |
| 5,672,964 A | 9/1997 | Mnci | |
| 5,867,019 A | 2/1999 | Malenko et al. | |
| 6,356,853 B1 | 3/2002 | Sullivan | |
| 6,507,207 B2 * | 1/2003 | Nguyen | G01R 1/07357 324/755.11 |
| 6,512,361 B1 | 1/2003 | Becker | |
| 6,518,780 B1 | 2/2003 | Campbell et al. | |
| 6,650,131 B2 | 11/2003 | Campbell et al. | |
| 6,704,670 B2 | 3/2004 | McTigue | |
| 6,863,576 B2 | 3/2005 | Campbell et al. | |
| 6,888,341 B2 | 5/2005 | Johnson et al. | |
| 6,956,389 B1 | 10/2005 | Mai | |
| 7,061,262 B2 | 6/2006 | Mai | |
| 7,221,179 B1 | 5/2007 | Campbell | |
| 7,492,177 B1 | 2/2009 | Campbell | |
| 8,832,933 B2 | 9/2014 | Kuo et al. | |
| 9,157,931 B2 | 10/2015 | Okada et al. | |
| 9,417,263 B2 | 8/2016 | Kuo et al. | |
| 9,791,473 B2 | 10/2017 | Nie | |
| 9,823,273 B2 | 11/2017 | Martin et al. | |
| D830,866 S | 10/2018 | Brekke et al. | |
| 10,168,356 B2 | 1/2019 | Campbell et al. | |
| 10,228,390 B2 | 3/2019 | McGrath, Jr. et al. | |
| 10,302,676 B2 | 5/2019 | Mende et al. | |
| 10,309,987 B2 | 6/2019 | Kim et al. | |
| 10,852,322 B1 | 12/2020 | Rosas et al. | |
| 11,187,723 B2 | 11/2021 | Kunze et al. | |
| 11,268,981 B2 | 3/2022 | Treibergs et al. | |
| 11,293,947 B2 | 4/2022 | Selvaraj et al. | |
| 11,307,222 B2 | 4/2022 | Morgana | |
| 2002/0076971 A1 * | 6/2002 | Khoury | H01R 12/57 439/418 |
| 2004/0236316 A1 | 11/2004 | Danitz et al. | |
| 2006/0033521 A1 | 2/2006 | Mai | |
| 2006/0043959 A1 | 3/2006 | Cavoretto | |
| 2006/0209483 A1 | 9/2006 | Hurwicz | |
| 2009/0189597 A1 | 7/2009 | Lagerberg et al. | |
| 2012/0098562 A1 | 4/2012 | Tan | |
| 2012/0153980 A1 | 6/2012 | Wu | |
| 2017/0271826 A1 | 9/2017 | Mende et al. | |
| 2017/0288357 A1 | 10/2017 | Price | |
| 2018/0267083 A1 | 9/2018 | Wei et al. | |
| 2019/0227099 A1 | 7/2019 | Chen et al. | |
| 2022/0326280 A1 | 10/2022 | Hock et al. | |

FOREIGN PATENT DOCUMENTS

| | | |
|---|---|---|
| EP | 4075149 A2 | 10/2022 |
| KR | 20090050772 A | 5/2009 |
| TW | I606240 B | 11/2017 |
| TW | I639836 B | 11/2018 |
| TW | I713939 B | 12/2020 |
| WO | WO0210675 A1 | 2/2002 |
| WO | WO18112166 A1 | 6/2018 |
| WO | WO19120961 A1 | 6/2019 |

OTHER PUBLICATIONS

Dynometer, "Dynamoter Jointed Test Finger for Household Electrical Product", Retrieved at https://www.alibaba.com/product-detail/Dynamometer-Jointed-Test-Finger-For-Household_60232452953.html on Oct. 20, 2022.

Bonad "Articulated Finger Probe for Safety Test Probe Standard Test Finger Product", Retrieved at https://www.alibaba.com/product-detail/Articulated-finger-probe-for-safety-test_60142635414.html on Oct. 20, 2022.

Honas, "ul100 hinge jointed test finger probe product", Retrieved at https://www.aliexpress.us/item/3256803525751516.html?gatewayAdapt=glo2usa4itemAdapt&_randl_shipto=US on Oct. 20, 2022.

* cited by examiner

CONTACTING THE ELECTRICAL TERMINAL CAVITY WITH THE DEVICE

602 detecting, via the device, the voltage level in the electrical terminal cavity

604 displaying, via a user interface on the device, a measurement of the voltage level of the electrical terminal cavity

ELECTRICAL TESTING DEVICE WITH PROBE HAVING PORTIONS WITH DIFFERENT CROSS-SECTIONAL AREAS

BACKGROUND

Electrical testing devices, such as a handheld electrical testing device, is often used to measure electrical voltage, current (amperage), resistance, and other values. Examples of electrical testing devices are a multimeter, a volt-ohm meter, a multitester, a voltmeter, an ammeter, an ohmmeter, or the like. These electrical testing devices can include analog and digital versions and are useful for everything from simple tests, like measuring battery voltage, to detecting faults and complex diagnostics in electrical components. Electricians often use electrical testing devices for troubleshooting electrical problems on motors, appliances, circuits, power supplies, and other wiring systems by inserting appropriate probes into one or more terminals on an active circuit to measure a desired capacity of the circuit.

However, probes used for electrical testing are not always of the optimal size and shape for terminals in which electrical testing is required, such as in current late model vehicles, which can cause the probe to fall out, expand the terminal, or damage the connector housing.

OVERVIEW

Disclosed herein is an electrical testing device with a probe having portions with different cross-sectional areas. The probe allows for contact with the pins in electrical connectors of non-standard sizes without over-expanding the pins, for the probe to engage the terminal with a desired force, and for an increase the electrical connection surface area, as compared to probes without portions having different cross-sectional areas.

One aspect of the disclosure is a device for testing a voltage level in an electrical terminal cavity comprising: a testing body and a probe for contacting the electrical terminal cavity. The probe includes a tip portion configured to contact the electrical terminal cavity such that the tip portion comprises a first cross-sectional area along a length of the tip portion, a base portion configured to connect the probe to the testing body such that the base portion comprises a second cross-sectional area along a length of the base portion, an intermediate portion extending from the tip portion to the base portion such that the intermediate portion comprises a third cross-sectional area along a length of the intermediate portion, the first cross-sectional area is smaller than the third cross-sectional area, and the third cross-sectional area is smaller than the second cross-sectional area. The intermediate portion is concentric with the tip portion and the base portion and an axis extending between a center of the tip portion, a center of the intermediate portion, a center of the base portion, and a center of the testing body. The device also includes a circuit disposed within the testing body such that the circuit is operatively coupled with the probe such that circuit is configured to sense the voltage level in the electrical terminal cavity.

In an embodiment of the device, the first cross-sectional area is substantially constant along the length of the tip portion, the second cross-sectional area is substantially constant along the length of the base portion, and the third cross-sectional area is substantially constant along the length of the intermediate portion.

In an embodiment of the device, the first cross-sectional area has a rectangular shape, the second cross-sectional area has a rectangular shape, and the third cross-sectional area has a rectangular shape.

In an embodiment of the device, the first cross-sectional area has a circular shape, the second cross-sectional area has a circular shape, and the third cross-sectional area has a circular shape.

In an embodiment of the device, a contact surface of the tip portion of the probe is configured to make contact with the electrical terminal cavity.

In an embodiment of the device, the tip portion of the probe provides a shortest distance between the testing body and the contact surface of the tip portion of the probe, the shortest distance being configured to provide a low resistance path from the contact surface to the testing body.

In an embodiment of the device, when engaged, the testing body conducts an electrical current.

In an embodiment of the device, the testing body is enclosed in an electrically-insulating layer.

In an embodiment of the device, the device further includes a user interface.

In an embodiment of the device, the user interface is configured to display a measurement of the voltage level of the electrical terminal cavity.

In an embodiment of the device, the user interface is configured to display the measurement of the voltage level with at least three significant digits.

In an embodiment of the device, the device further includes a circuit protector.

In an embodiment of the device, the circuit protector comprises a fuse or a circuit breaker.

Another aspect of the disclosure is a method of using a device for testing a voltage level in an electrical terminal cavity, the method comprising contacting the electrical terminal cavity with the device such that the device includes a testing body and a probe for contacting the electrical terminal cavity. The probe includes a tip portion configured to contact the electrical terminal cavity such that the tip portion comprises a first cross-sectional area along a length of the tip portion, a base portion configured to connect the probe to the testing body such that the base portion comprises a second cross-sectional area along a length of the base portion, an intermediate portion extending from the tip portion to the base portion such that the intermediate portion comprises a third cross-sectional area along a length of the intermediate portion, the first cross-sectional area is smaller than the third cross-sectional area, and the third cross-sectional area is smaller than the second cross-sectional area. The intermediate portion is concentric with the tip portion and the base portion and an axis extending between a center of the tip portion, a center of the intermediate portion, a center of the base portion, and a center of the testing body. The device also includes a circuit disposed within the testing body such that the circuit is operatively coupled with the probe such that circuit is configured to sense the voltage level in the electrical terminal cavity.

In an embodiment of the method, the method also includes detecting, via the device, the voltage level in the electrical terminal cavity.

In an embodiment of the method, the method also includes displaying, via a user interface on the device, a measurement of the voltage level of the electrical terminal cavity.

In an embodiment of the method, the measurement of the voltage level of the electrical terminal cavity comprises at least three significant digits.

In an embodiment of the method, the first cross-sectional area is substantially constant along the length of the tip portion, the second cross-sectional area is substantially constant along the length of the base portion, and the third cross-sectional area is substantially constant along the length of the intermediate portion.

In an embodiment of the method, a contact surface of the tip portion of the probe is configured to make contact with the electrical terminal cavity.

In an embodiment of the method, when engaged, the testing body conducts an electrical current.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

DETAILED DESCRIPTION

This description describes several example embodiments, at least some of which pertain to devices for testing a voltage level in an electrical terminal cavity, such as a device including a power source and a voltmeter, an ammeter, and/or an ohmmeter. As noted above, a need exists for a probe on a device that can be used to allow for good contact with the pins in electrical connectors of non-standard sizes without over-expanding the pins, engage the terminal with optimal force, and create an increase the electrical connection surface area, as compared to generic probe tips.

Such a device includes a testing body and a probe for contacting the electrical terminal cavity. The probe includes a tip portion configured to contact the electrical terminal cavity such that the tip portion comprises a first cross-sectional area along a length of the tip portion, a base portion configured to connect the probe to the testing body such that the base portion comprises a second cross-sectional area along a length of the base portion, an intermediate portion extending from the tip portion to the base portion such that the intermediate portion comprises a third cross-sectional area along a length of the intermediate portion, the first cross-sectional area is smaller than the third cross-sectional area, and the third cross-sectional area is smaller than the second cross-sectional area. The intermediate portion is concentric with the tip portion and the base portion and an axis extending between a center of the tip portion, a center of the intermediate portion, a center of the base portion, and a center of the testing body. The device also includes a circuit disposed within the testing body such that the circuit is operatively coupled with the probe such that circuit is configured to sense the voltage level in the electrical terminal cavity.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

II. Example Devices

Figure 1:
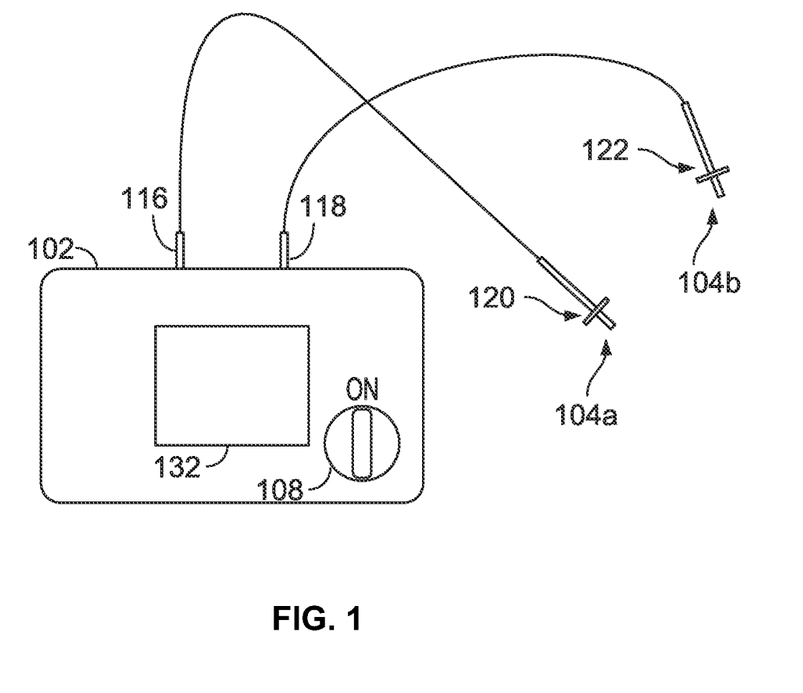
FIG. 1 is a schematic diagram showing a device for testing a voltage level in an electrical terminal cavity, according to an example embodiment.

FIG. 1 is a schematic diagram showing a device 100 for testing a voltage level in an electrical terminal cavity. The device 100 can include any component described in FIG. 2 below. In some embodiments, the device 100 includes a testing body 102 having a power source 108, a first port 116, a second port 118, a first connection lead 120, and a second connection lead 122. Each of the first connection lead 120 and the second connection lead 122 may have a first end configured to be coupled with the first port 116 and the second port 118 and a second end configured to include a probe 104a and 104b respectively.

As such, the device 100 can be used to apply voltage to the electrical component to be tested by connecting the first port 116 to a first electrical terminal cavity using probe 104a through the first connection lead 120 (e.g., fixedly or removably) and by connecting the second port 118 to a second electrical terminal cavity using probe 104b via the second connection lead 122 (e.g., fixedly or removably). This will power the electrical component between the first electrical terminal cavity and the second terminal cavity in order to obtain a reading at the device 100.

Figure 2:
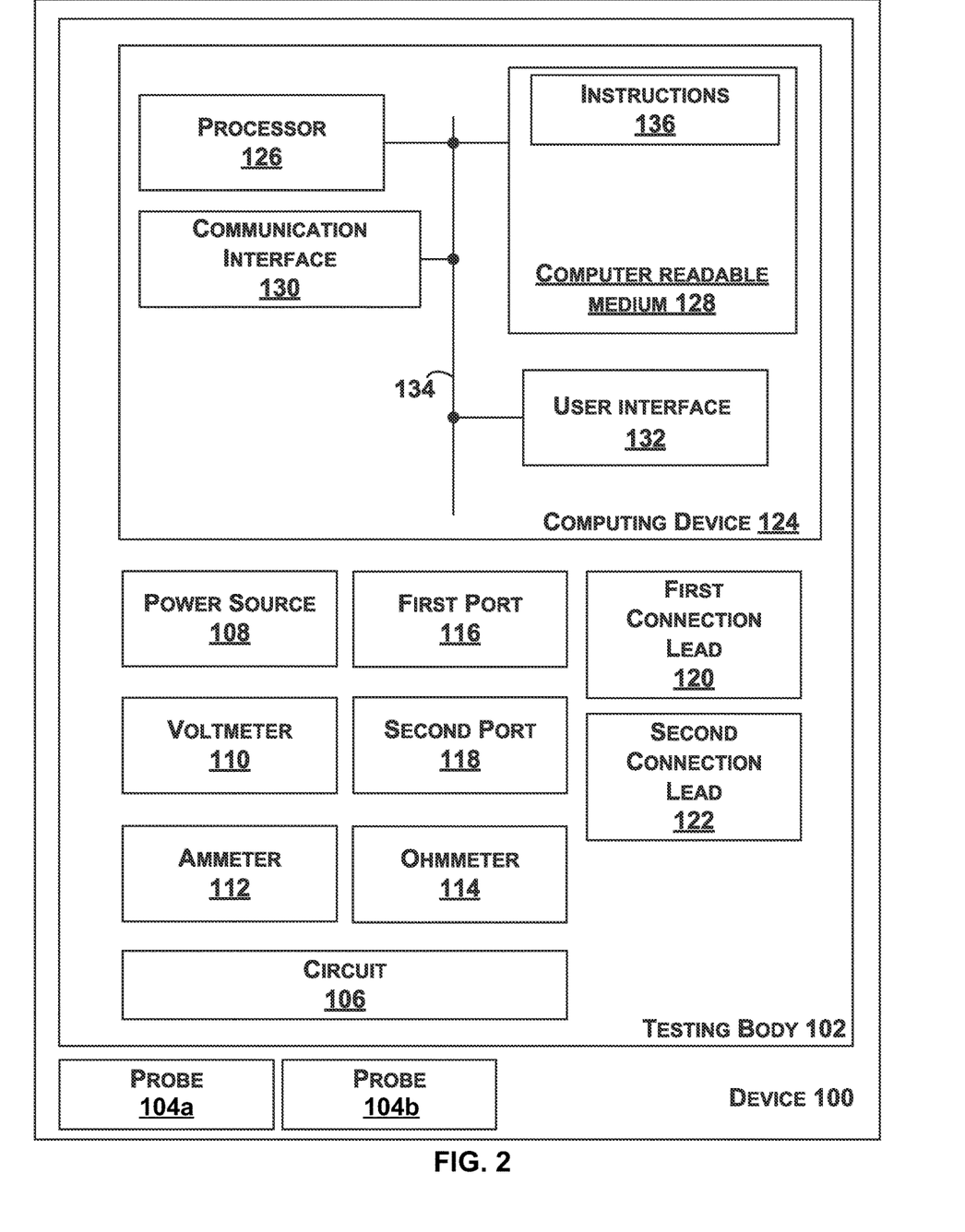
FIG. 2 is a block diagram of a device for testing a voltage level in an electrical terminal cavity, according to an example embodiment.

FIG. 2 is a block diagram of the device 100 for testing a voltage level in an electrical terminal cavity. The device 100 includes a testing body 102, probes 104a and 104b for contacting the electrical terminal cavity, and a circuit 106 disposed within the testing body 102. In some embodiments, the probe 104 can have different configurations and/or geometries suitable for testing differing electrical terminal cavities, as discussed herein. Also, in some embodiments, the circuit 106 can be an analog or a digital circuit, depending on the embodiment of the device 100. As such, the circuit 106 may be disposed within the testing body 102 such that the circuit 106 is operably coupled with the probes 104a and 104b in order to sense the voltage level in the electrical terminal cavity. Although two probes (probes 104a and 104b) are described in the device 100 above, in other embodiments the device can include only one probe or more than two probes. Further, although the device 100 is being used to measure voltage, in other embodiments the device may also be used to measure current (Ohm's law) or another electrical parameter.

In some embodiments, the testing body 102 optionally further includes a power source 108, a voltmeter 110, an ammeter 112, an ohmmeter 114, a first port 116, a second port 118, a first connection lead 120, a second connection lead 122, and/or a computing device 124. The computing device 124 can include one or more processors 126, a non-transitory computer readable medium 128, a communication interface 130, and/or a user interface 132.

Components of the computing device 124 can be linked together by a system bus, network, or other connection mechanism 134. The one or more processors 126 can be any type of processor(s), such as a microprocessor, a field programmable gate array, a digital signal processor, a multicore processor, etc., coupled to the non-transitory computer readable medium 104. The non-transitory computer readable medium 128 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 128 can store instructions 136. The instructions 136 are executable by the one or more processors 126 to cause the computing device 124 (e.g., the test device 100) to perform any of the functions or methods described herein.

The communication interface 130 can include hardware to enable communication within the computing device 124 and/or between the computing device 124 and one or more other devices. The hardware can include any type of input and/or output interfaces, a universal serial bus (USB), PCI Express, transmitters, receivers, and antennas, for example. The communication interface 130 can be configured to facilitate communication with one or more other devices, in accordance with one or more wired or wireless communication protocols. For example, the communication interface 130 can be configured to facilitate wireless data communication for the computing device 124 according to one or more wireless communication standards, such as one or more Institute of Electrical and Electronics Engineers (IEEE) 801.11 standards, ZigBee standards, Bluetooth standards, etc. As another example, the communication interface 130 can be configured to facilitate wired data communication with one or more other devices. The communication interface 106 can also include analog-to-digital converters (ADCs) or digital-to-analog converters (DACs) that the computing device 124 can use to control various components of the computing device 124 or external devices.

The user interface 132 can include any type of display component configured to display data. As one example, the user interface 132 can include a touchscreen display. As another example, the user interface 132 can include a flat-panel display, such as a liquid-crystal display (LCD) or a light-emitting diode (LED) display. The user interface 132 can include one or more pieces of hardware used to provide data and control signals to the computing device 124. For instance, the user interface 132 can include a mouse or a pointing device, a keyboard or a keypad, a microphone, a touchpad, or a touchscreen, among other possible types of user input devices. Generally, the user interface 132 can enable an operator to interact with a graphical user interface (GUI) provided by the computing device 124 (e.g., displayed by the user interface 132).

The power source 108 typically takes the form of a rechargeable battery, but other examples are possible. In some embodiments, the user interface 132 is configured to display a measurement of the voltage level of the electrical terminal cavity. In some embodiments, the user interface 132 is configured to display the measurement of the voltage level with at least three significant digits.

The voltmeter 110 is an instrument configured to provide digital or analog output that indicates a voltage detected between inputs of the voltmeter 110. The voltmeter 110 generally includes a high resistance between the inputs of the voltmeter 110 when compared to the circuit under test such that measurement of the voltage does not change the voltage substantially. By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For instance, in some embodiments, having a constant cross section is within +/−5% of constant along a length of the shape. The first port 116 is configured for receiving the first connection lead 120 and the second port 118 is configured for receiving the second connection lead 122.

In some embodiments, the device 100 can, when engaged, have the testing body 102 conduct an electrical current. Further, in some embodiments, the testing body 102 also includes an enclosure that comprises an electrically-insulating layer. As such, the testing body 102 is shielded from any adverse effects of electrical contact. In addition, in some embodiments, the testing body 102 further includes a circuit protector. The circuit protector can be a fuse or a circuit breaker, for example.

Figure 3:
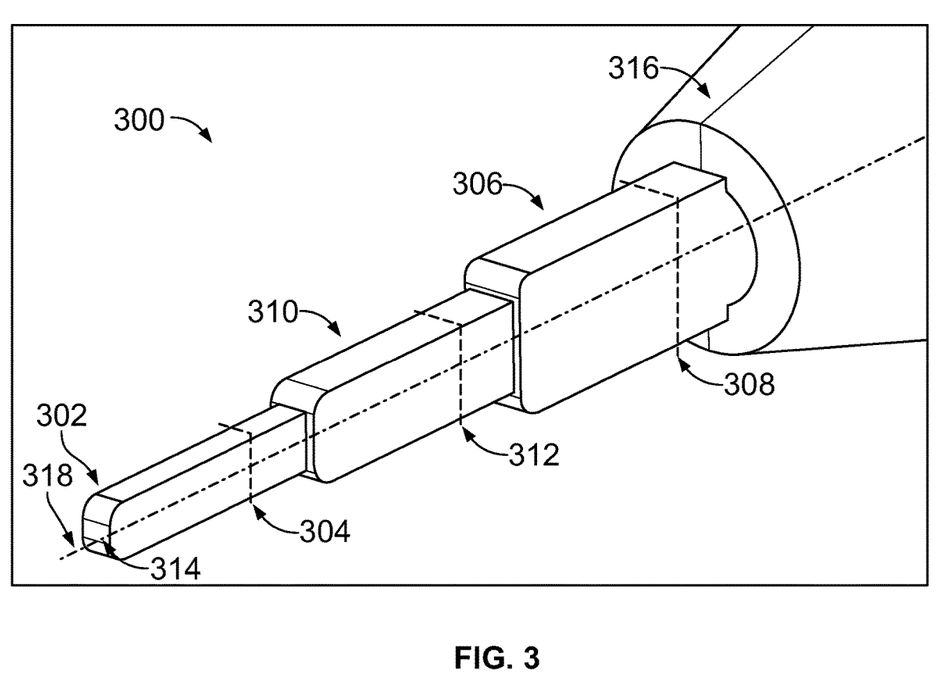
FIG. 3 is a schematic diagram showing a probe for testing a voltage level in an electrical terminal cavity, according to an example embodiment.

FIG. 3 is a schematic diagram showing a probe 300. The probe 300 can be used as any of the probes 104a and 104b in the devices described in FIG. 1 or 2. The probe 300 includes a tip portion 302 configured to contact the electrical terminal cavity. The tip portion 302 has a first cross-sectional area 304 along a length of the tip portion 302. The probe 300 also includes a base portion 306 configured to connect the probe 300 to a testing body. The base portion 306 has a second cross-sectional area 308 along a length of the base portion 306. The probe 300 also includes an intermediate portion 310 extending from the tip portion 302 to the base portion 306. The intermediate portion 310 has a third cross-sectional area 312 along a length of the intermediate portion 310. In some embodiments, the first cross-sectional area 304 is smaller than the third cross-sectional area 312 and the third cross-sectional area 312 is smaller than the second cross-sectional area 308. Also in some embodiments, the intermediate portion 310 is concentric with the tip portion 302 and the base portion 306 such that an axis 318 extends between a center of the tip portion 302, a center of the intermediate portion 310, a center of the base portion 306, and a center of the testing body of the device 316. In some embodiments, the probe 300 includes a plurality of intermediate sections.

In some embodiments, the first cross-sectional area 304 is substantially constant along the length of the tip portion 302, the second cross-sectional area 308 is substantially constant along the length of the base portion 306, and the third cross-sectional area 312 is substantially constant along the length of the intermediate portion 310. For purposes of this application, being substantially constant entails being exactly constant and/or being one or more standard deviations away from constant, so long as performance is not impacted.

In some embodiments, such as the embodiment in FIG. 3, the first cross-sectional area 304 has a rectangular shape, the second cross-sectional area 308 has a rectangular shape, and the third cross-sectional area 312 has a rectangular shape. Other shapes are possible, including a square shape and a four-sided polygon shape. In some embodiments, a contact surface 314 of the tip portion 302 of the probe 300 is configured to make contact with the electrical terminal cavity.

In some embodiments, the tip portion 302 of the probe 300 provides a shortest distance between the testing body of a device and the contact surface 314 of the tip portion 302 of the probe 300 such that the shortest distance provides a low resistance path from the contact surface to the testing body of the device. Because of the geometry of the probe 300 and how it is arranged in the device, the safest and most reliable connection for reading one or more characteristics of an electrical component that is desired to be tested is through the shortest electrical path because the shortest electrical path is the path of least resistance. As such, the probe 300 reduces risks energy flowing along an undesired route and improves accuracy of the device's reading by being configured to be the shortest electrical path from the contact surface 314 of the tip portion 302 to the testing body of the device 314.

Figure 4:
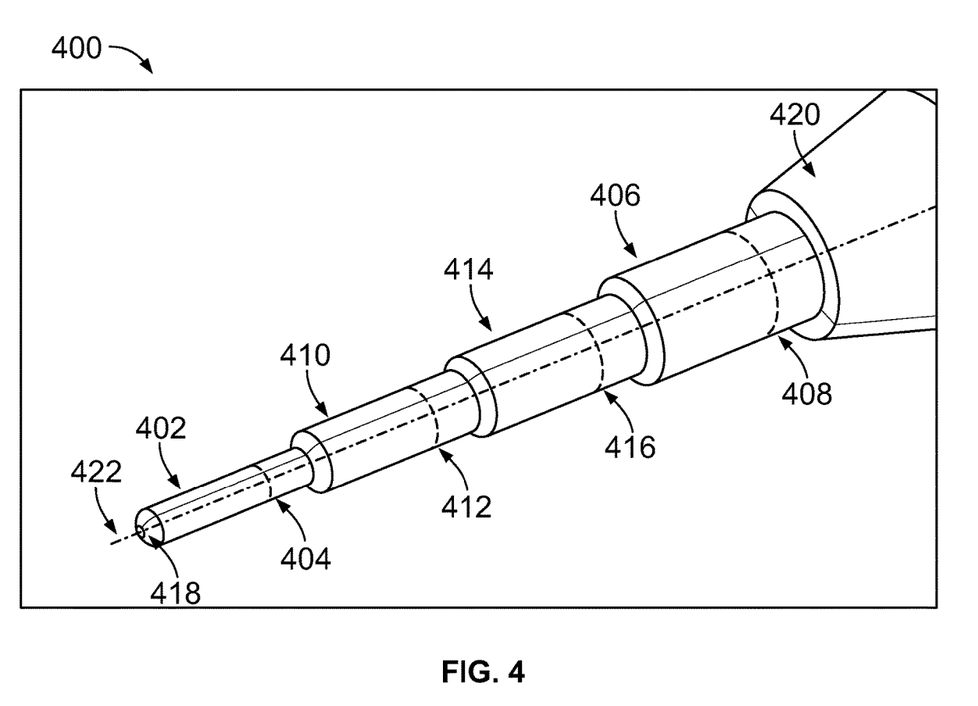
FIG. 4 is a schematic diagram showing another probe for testing a voltage level in an electrical terminal cavity, according to an example embodiment.

FIG. 4 is a schematic diagram showing a probe 400. The probe 400 can also be used as any of the probes 104a and 104b in the devices embodied in FIG. 1 or 2.

The probe 400 includes a tip portion 402 configured to contact the electrical terminal cavity. The tip portion 402 has a first cross-sectional area 404 along a length of the tip portion 402. The probe 400 also includes a base portion 406 configured to connect the probe 400 to a testing body of an electrical testing device having a testing circuit. The base portion 406 has a second cross-sectional area 408 along a length of the base portion 406. The probe 400 also includes a first intermediate portion 410 extending from the tip portion 402 to a second intermediate portion 414, which extends between the first intermediate portion 410 and the base portion 406. More or less intermediate sections are possible.

The first intermediate portion 410 has a third cross-sectional area 412 along a length of the intermediate portion 410. The second intermediate portion 414 has a fourth cross-sectional area 416 along a length of the intermediate portion 410. In some embodiments, the first cross-sectional area 404 is smaller than the third cross-sectional area 412, the third cross-sectional area 412 is smaller than the fourth cross-sectional area 416, and the fourth cross-sectional area 416 is smaller than the second cross-sectional area 408. Also in some embodiments, the intermediate portions 410 and 414 are concentric with the tip portion 402 and the base portion 406 such that an axis 422 extends between a center of the tip portion 402, a center of the first intermediate portion 410, a center of the second intermediate portion 414, a center of the base portion 406, and a center of the testing body of the device 420.

In some embodiments, such as the embodiment in FIG. 4, the first cross-sectional area 404 has a circular shape, the second cross-sectional area 408 has a circular shape, the third cross-sectional area 412 has a circular shape, and the fourth cross-sectional area 416 has a circular shape. This shape differs from the probe 300 in FIG. 3, each of which are designed to enter into an electrical terminal cavity having a specific shape, size, and/or opening dimension. Other shapes for the cross-sectional areas of the probe 400 are possible, including an oval shape, an elliptical shape, a triangular shape, a square shape, or the like. In some embodiments, a contact surface 418 of the tip portion 402 of the probe 400 is configured to make contact with the electrical terminal cavity.

Figure 5:
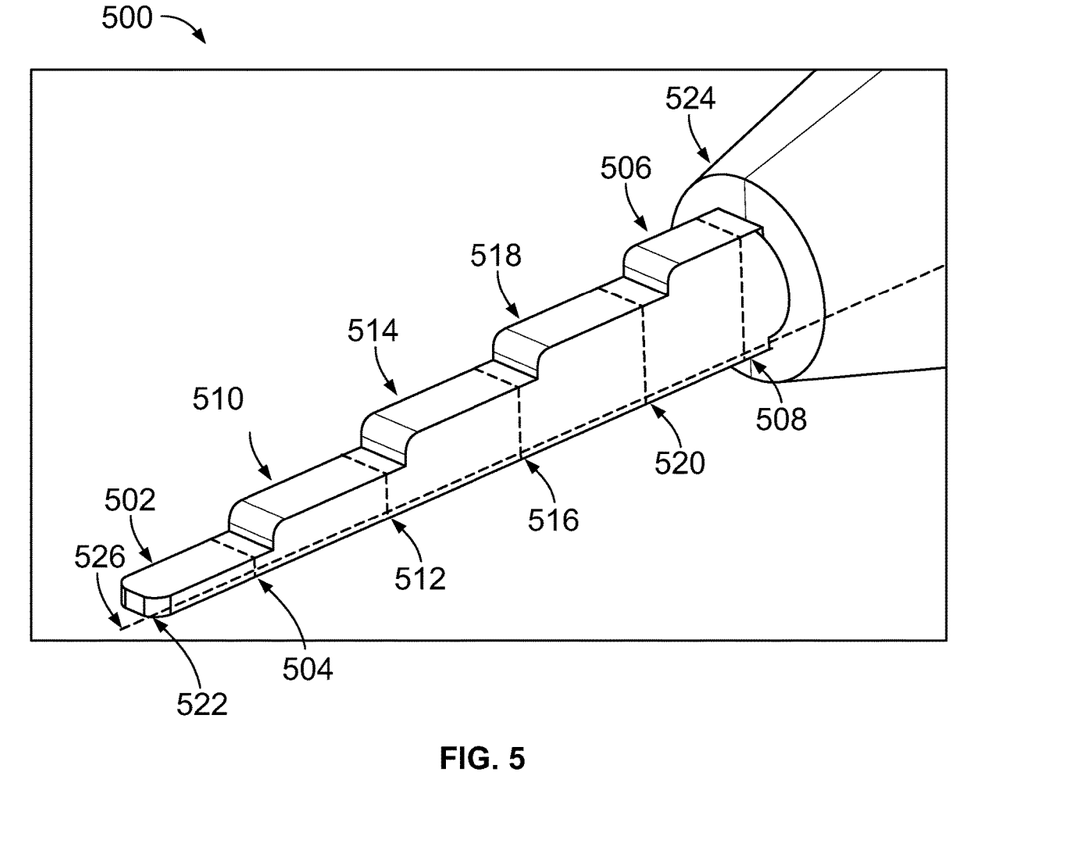
FIG. 5 is a schematic diagram showing another probe for testing a voltage level in an electrical terminal cavity, according to an example embodiment.

FIG. 5 is a schematic diagram showing a probe 500. The probe 500 can be used as any of the probes 104 in the devices embodied in FIG. 1 or 2. The probe 500 includes a tip portion 502 configured to contact the electrical terminal cavity. The tip portion 502 has a first cross-sectional area 504 along a length of the tip portion 502. The probe 500 also includes a base portion 506 configured to connect the probe 500 to a testing body. The base portion 506 has a second cross-sectional area 508 along a length of the base portion 506. The probe 500 also includes a first intermediate portion 510 extending from the tip portion 502 to a second intermediate portion 514, which extends between the first intermediate portion 510 to a third intermediate portion 518 that extends between the second intermediate portion 514 and the base 506. More or less intermediate portions are possible. The first intermediate portion 510 has a third cross-sectional area 512 along a length of the first intermediate portion 510, the second intermediate portion 514 has a fourth cross-sectional area 516 along a length of the second intermediate portion 514, and the third intermediate portion 518 has a fifth cross-sectional area 520 along a length of the third intermediate portion 518. In some embodiments, the first cross-sectional area 504 is smaller than the third cross-sectional area 512, the third cross-section area 512 is smaller than the fourth cross-sectional area 516, the fourth cross-sectional area 516 is smaller than the fifth cross-sectional area 520, and the fifth cross-sectional area 520 is smaller than the second cross-sectional area 508. Also in some embodiments, the intermediate portions 510, 514, and 518 are not concentric with the tip portion 502 and the base portion 506, but is instead arranged in a step-like configuration such that an axis 526 extends between a bottom of the tip portion 502, a bottom of the intermediate portion 510, a bottom of the base portion 506, and through the testing body of the device 524. In other embodiments, the axis may extend along a top, a side, or any other surface of the device 500. Further, in some embodiments, a device may include a plurality of probes, each having a different shape. For example, a device may include a first probe 300, a second probe 400, and a third probe 500.

Figure 6:
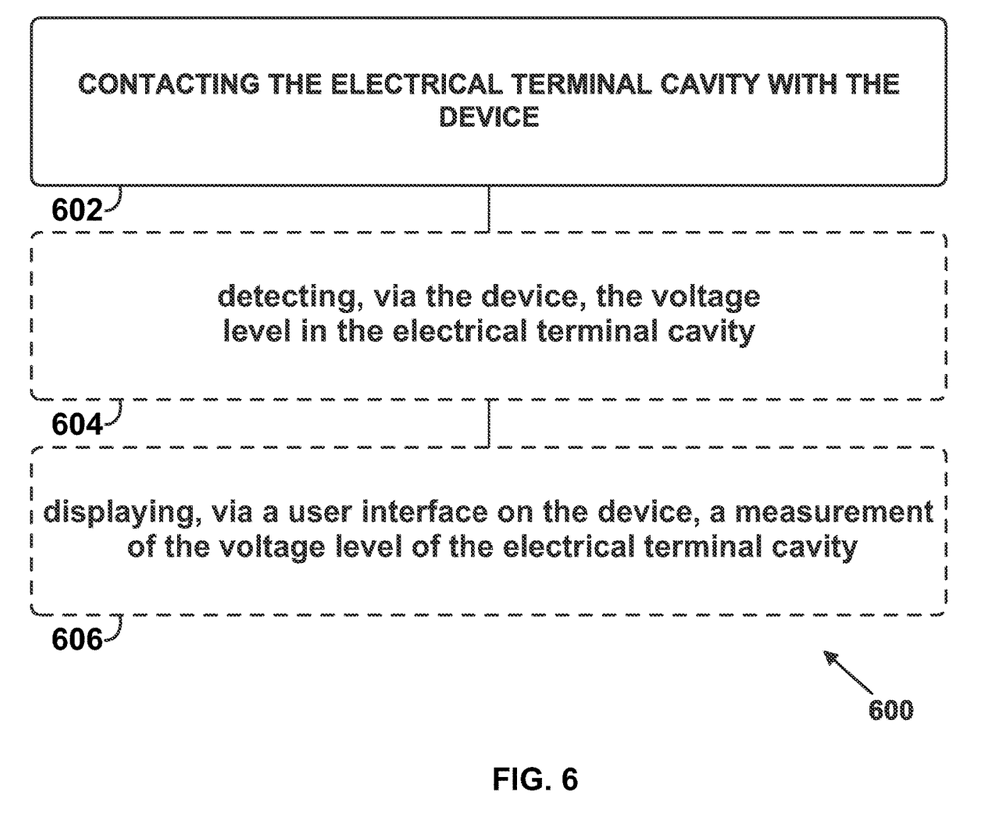
FIG. 6 is a block diagram of a method of using a device for testing a voltage level in an electrical terminal cavity, according to an example embodiment.

FIG. 6 is a block diagram of a method 600 for operating the device 100. As shown in FIG. 6, the method 600 includes one or more operations, functions, or actions as illustrated by blocks 602. Any blocks may be performed in parallel, and/or in a different order than those described herein. Also, the various blocks may be combined into fewer blocks, divided into additional blocks, and/or removed based upon the desired implementation.

At block 602, the method 600 of using a device for testing a voltage level in an electrical terminal cavity includes contacting the electrical terminal cavity with the device. The device can include any component of FIGS. 1-5, including a testing body and a probe for contacting the electrical terminal cavity.

In some embodiments, the method includes detecting, via the device, the voltage level in the electrical terminal cavity. Further, in some embodiments, the method includes displaying, via a user interface on the device, a measurement of the voltage level of the electrical terminal cavity. In some embodiments, the measurement of the voltage level of the electrical terminal cavity includes at least three significant digits.

In some embodiments, the method includes the device having the first cross-sectional area be substantially constant along the length of the tip portion, the second cross-sectional area be substantially constant along the length of the base portion, and the third cross-sectional area be substantially constant along the length of the intermediate portion. In some embodiments, a contact surface of the tip portion of the probe is configured to make contact with the electrical terminal cavity. In some embodiments, when engaged, the testing body conducts an electrical current. In some embodiments, the method includes measuring other electrical parameters than voltage, such as current (Ohm's law) or the like.

III. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a system.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A device for testing a voltage level in an electrical terminal cavity, the device comprising:
   a testing body;
   a probe for contacting the electrical terminal cavity, the probe comprising:
      a tip portion configured to contact the electrical terminal cavity, wherein the tip portion comprises a first cross-sectional area along a length of the tip portion;
      a base portion configured to connect the probe to the testing body, wherein the base portion comprises a second cross-sectional area along a length of the base portion;
      an intermediate portion extending from the tip portion to the base portion, wherein the intermediate portion comprises a third cross-sectional area along a length of the intermediate portion, wherein the first cross-sectional area is smaller than the third cross-sectional area, wherein the third cross-sectional area is smaller than the second cross-sectional area, and wherein the intermediate portion is concentric with the tip portion and the base portion; and
      an axis extending between a center of the tip portion, a center of the intermediate portion, a center of the base portion, and a center of the testing body; and
   a circuit disposed within the testing body, wherein the circuit is operatively coupled with the probe such that circuit is configured to sense the voltage level in the electrical terminal cavity.

2. The device of claim 1, wherein the first cross-sectional area is substantially constant along the length of the tip portion, the second cross-sectional area is substantially constant along the length of the base portion, and the third cross-sectional area is substantially constant along the length of the intermediate portion.

3. The device of claim 1, wherein the first cross-sectional area has a rectangular shape, the second cross-sectional area has a rectangular shape, and the third cross-sectional area has a rectangular shape.

4. The device of claim 1, wherein the first cross-sectional area has a circular shape, the second cross-sectional area has a circular shape, and the third cross-sectional area has a circular shape.

5. The device of claim 1, wherein a contact surface of the tip portion of the probe is configured to make contact with the electrical terminal cavity.

6. The device of claim 5, wherein the tip portion of the probe provides a shortest distance between the testing body and the contact surface of the tip portion of the probe, the shortest distance being configured to provide a low resistance path from the contact surface to the testing body.

7. The device of claim 1, wherein when engaged, the testing body conducts an electrical current.

8. The device of claim 1, wherein the testing body is enclosed in an electrically-insulating layer.

9. The device of claim 1, further comprising a user interface.

10. The device of claim 9, wherein the user interface is configured to display a measurement of the voltage level of the electrical terminal cavity.

11. The device of claim 10, wherein the user interface is configured to display the measurement of the voltage level with at least three significant digits.

12. The device of claim 1, further comprising a circuit protector.

13. The device of claim 12, wherein the circuit protector comprises a fuse or a circuit breaker.

14. A method of using a device for testing a voltage level in an electrical terminal cavity, the method comprising:

contacting the electrical terminal cavity with the device, wherein the device comprises:

a testing body;

a probe for contacting the electrical terminal cavity, the probe comprising:

a tip portion configured to contact the electrical terminal cavity, wherein the tip portion comprises a first cross-sectional area along a length of the tip portion;

a base portion configured to connect the probe to the testing body, wherein the base portion comprises a second cross-sectional area along a length of the base portion;

an intermediate portion extending from the tip portion to the base portion, wherein the intermediate portion comprises a third cross-sectional area along a length of the intermediate portion, wherein the first cross-sectional area is smaller than the third cross-sectional area, wherein the third cross-sectional area is smaller than the second cross-sectional area, and wherein the intermediate portion is concentric with the tip portion and the base portion; and an axis extending between a center of the tip portion, a center of the intermediate portion, a center of the base portion, and a center of the testing body; and a circuit disposed within the testing body, wherein the circuit is operatively coupled with the probe such that circuit is configured to sense the voltage level in the electrical terminal cavity.

15. The method of claim 14, further comprising:

detecting, via the device, the voltage level in the electrical terminal cavity.

16. The method of claim 15, further comprising:

displaying, via a user interface on the device, a measurement of the voltage level of the electrical terminal cavity.

17. The method of claim 16, wherein the measurement of the voltage level of the electrical terminal cavity comprises at least three significant digits.

18. The method of claim 14, wherein the first cross-sectional area is substantially constant along the length of the tip portion, the second cross-sectional area is substantially constant along the length of the base portion, and the third cross-sectional area is substantially constant along the length of the intermediate portion.

19. The method of claim 14, wherein a contact surface of the tip portion of the probe is configured to make contact with the electrical terminal cavity.

20. The method of claim 14, wherein when engaged, the testing body conducts an electrical current.

* * * * *